United States Patent [19]

Griffith et al.

[11] Patent Number: 4,953,777
[45] Date of Patent: Sep. 4, 1990

[54] METHOD FOR REPAIRING BY SOLID STATE DIFFUSION METAL PARTS HAVING DAMAGED HOLES

[75] Inventors: Glenn E. Griffith; Joaquin Bustamante; Michael D. Scheel, all of San Antonio; Herbert Koven, Southlake, all of Tex.

[73] Assignee: Chromalloy Gas Turbine Corporation, Orangeburg, N.Y.

[21] Appl. No.: 193,213

[22] Filed: May 11, 1988

Related U.S. Application Data

[63] Continuation of Ser. No. 916,642, Oct. 8, 1986, abandoned.

[51] Int. Cl.⁵ ............................................. B23K 31/00
[52] U.S. Cl. .................................... 228/119; 228/193; 228/127; 228/115
[58] Field of Search ............... 228/119, 193, 161, 127, 228/243, 263.21

[56] References Cited

U.S. PATENT DOCUMENTS

| | | | |
|---|---|---|---|
| 3,487,530 | 1/1970 | Ely | 228/119 |
| 3,762,032 | 10/1973 | Bowling | 228/193 |

FOREIGN PATENT DOCUMENTS

| | | | |
|---|---|---|---|
| 2517839 | 11/1975 | Fed. Rep. of Germany | 228/127 |
| 2480483 | 10/1981 | France | 228/115 |
| 0023392 | 3/1981 | Japan | 228/243 |
| 0195591 | 12/1982 | Japan | 228/127 |

*Primary Examiner*—Kurt Rowan

*Attorney, Agent, or Firm*—Hopgood, Calimafde, Kalil, Blaustein & Judlowe

[57] ABSTRACT

A method is provided for repairing by solid state diffusion a damaged portion of an inner surface of a hole of a metal part. The method comprises machining the hole to a cylindrical diameter sufficient to remove the damaged portion therefrom and provide a new hole with a smooth finish into which a metal bushing is inserted, the outer diameter being of size and finish relative to the machined diameter of the hole to provide a close fit therewith, the composition of the metal bushing being compatible with that of the metal part. A cylindrical metal mandrel of diameter corresponding to the inner diameter of the bushing is inserted into the bushing to provide an assembly thereof with the metal part, the metal mandrel having a mean coefficient of thermal expansion greater than that of the metal bushing for a selected solid state diffusion temperature sufficient to provide pressure against the bushing. The assembly under substantially non-oxidizing conditions is then subjected to solid state diffusion at an elevated solid state temperature corresponding to at least about 50% of the absolute melting point (solidus) of the metal part for a time at least sufficient to diffusion bond the bushing under pressure to the metal part by virtue of the expansion of the mandrel in the bushing at the diffusion temperature. The assembly is cooled to ambient, the mandrel removed, and the inner diameter of the diffusion-bonded bushing machined to an appropriate dimension. The diffusion-bonded part is preferably heat treated prior to machining of the bushing.

28 Claims, 6 Drawing Sheets

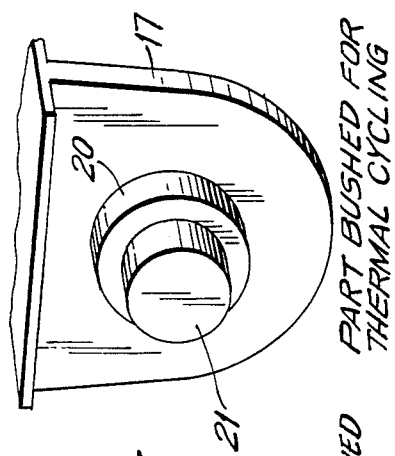
FIG. 2C PART BUSHED FOR THERMAL CYCLING
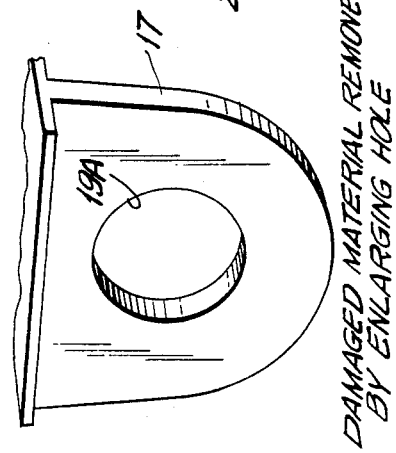
FIG. 2B DAMAGED MATERIAL REMOVED BY ENLARGING HOLE
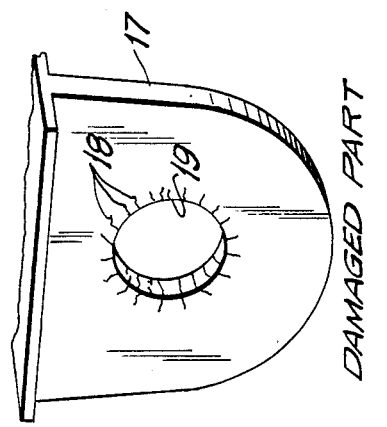
FIG. 2A DAMAGED PART
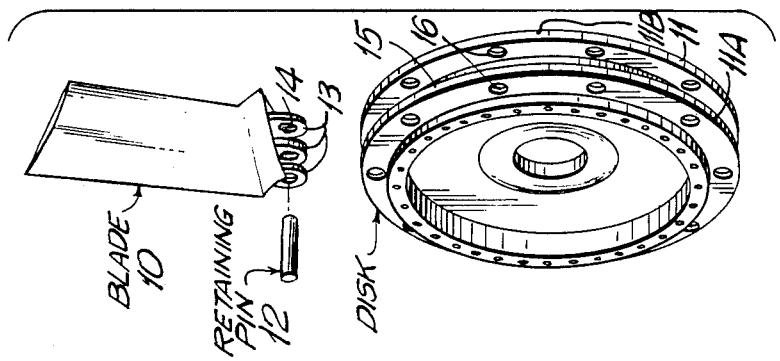
FIG. 1

METHOD FOR REPAIRING BY SOLID STATE DIFFUSION METAL PARTS HAVING DAMAGED HOLES

This application is a continuation of application Ser. No. 916,642, filed Oct. 8, 1986, now abandoned.

This invention relates to a method for repairing damaged working surfaces of holes in metal parts and, in particular, to mounting holes in turbine blades by means of which said blades are mounted to a rotatable disk of a fan rotor using retaining pins or other mechanical means as the blade attaching means.

STATE OF THE ART

It is known to produce metal structures by diffusion bonding of a plurality of workpieces or blanks at elevated temperatures using applied mechanical pressure, such as die pressure, as disclosed in U.S. Pat. No. 4,197,978.

Other methods are known for producing diffusion bonded metal structures in which the difference in the coefficient of thermal expansion between two or more parts is used for applying pressure during solid state diffusion at elevated temperatures. For example, in U.S. Pat. No. 3,559,274, a process is disclosed for the sheathing of the inside surface of a tubular nuclear fuel element in which a pipe made of Zircoloy 20 (trademark for a zirconium-base alloy) is introduced as a sheath in contact with the inside surface of the tubular fuel element at a temperature between +30° C. and −250° C. The sheath is then allowed to come up to room temperature and expand and thereby apply pressure against the fuel element. Solid state diffusion is then effected by raising the temperature of the sheath to 850° C. In U.S. Pat. No. 3,762,032, controlled pressure is applied to workpieces to effect diffusion bonding of one to the other by using a fixture which develops pressure by differential thermal expansion between inner and outer members of a fixture. The two abutting parts to be bonded, such as the trailing edge of a hollow blade, are bonded together by mounting the blade in the fixture comprising a multi-piece circular plug which snugly fits into a metal ring. The multi-piece plug holds the part of the blade to be diffusion bonded at the interface between two parts of the plug. The fixture is then heated to the desired bonding temperature whereby the abutting parts are caused to press against each other by means of the pressure arising from the difference in the coefficient of thermal expansion of the parts of the fixture.

U.S. Pat. No. 4,186,473 relates to a method for fabricating a hybrid dual property gas turbine wheel assembly made up of parts of dissimilar metallurgical properties. The hybrid dual property wheel includes diffusion bonding of an outer blade-containing ring to an inner disk assembly of a differing metallurgy. The disk is snugly fitted to the ring and the disk selectively heated and allowed to expand against the inside surface of the ring and bond thereto. The bonded disk is part of the final structure.

In a fan rotor assembly of the type used in jet engines, the fan blades are mounted on a rotatable disk. The fan blades may have one or more tangs by means of which the blades are attached in spaced relation around the periphery of the disk. In one embodiment, the blade has three tangs, each having a hole therein aligned along the same axis. The blade is mounted to the disk, the center tang entering a peripheral annular space of the disk, with the two outer tangs extending along the outside surface of each side of the disk which also has holes that line up with the holes of the tangs. (Note FIG. 1). A retaining pin is passed through the holes in the disk and the aligned holes of the tangs to attach each of the blades to the periphery of the disk.

A problem with this type of connection is that the holes in the tangs are subjected to stress during use and wear away or deform by elongation. In other instances, the holes are subject to fretting corrosion. Thus, after a given length of service the blades must be removed and discarded.

As the blades are quite expensive, it would be desirable to provide a method for repairing such blades so that they can be used again. The particular blade of interest is one made of a titanium-base alloy referred to in the trade as Ti/8/1/1 alloy which contains about 8% Al, about 1% Mo, about 1% V and the balance essentially titanium.

OBJECTS OF THE INVENTION

It is an object of the invention to provide a method for repairing damaged holes of a metal part, such as a turbine blade.

Another object is to provide as an article of manufacture a repaired turbine blade for use in fan rotor assemblies.

These and other objects will more clearly appear when taken in conjunction with the following disclosure, the appended claims and the drawings.

THE DRAWINGS

FIG. 1 is an exploded view of a portion of a fan rotor comprising a disk, an enlarged view of a turbine blade having three mounting tangs and a retaining pin for attaching the blade to the periphery of the disk;

FIGS. 2A, 2B and 2C depict an enlarged view of a fragment of a blade in the form of a tang with a hole in it showing respectively a damaged hole (FIG. 2A), the same hole after machining (FIG. 2B) and an assembly (FIG. 2C) of a mandrel and a bushing inserted in the hole in preparation for a repair cycle;

SUMMARY OF THE INVENTION

Figure 3:
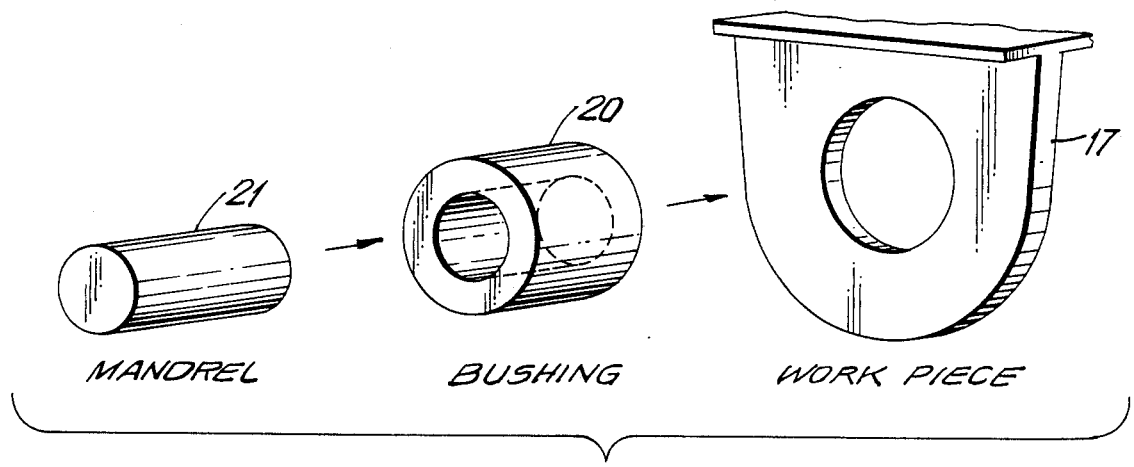
FIG. 3 is an exploded view of the steps employed in assembling the mandrel, bushing and tang of the blade preparatory to a repair cycle.

Stating it broadly, a method is provided for repairing by solid state diffusion a damaged portion of an inner surface of a hole in a metal part, the hole originally being of a specified diameter or having a polygonal configuration. The steps employed include machining the hole to a cylindrical diameter sufficient to remove the damaged portion therefrom and provide a new hole with a smooth finish.

A bushing is then provided of a composition compatible with that of the metal part, preferably the same alloy composition as the metal part, the bushing having an outer diameter of a size and finish relative to the machined diameter of the metal part such as to provide a close fit when the bushing is inserted therein. An interference fit may be employed.

Following insertion of the bushing, a metal mandrel is inserted into the opening of the bushing, the diameter of the mandrel being sufficient relative to the inside diameter of the bushing to provide a close fit therein. The metal mandrel selected is one having a mean thermal coefficient of expansion greater than that of the metal bushing for a selected solid state diffusion temperature The mean thermal coefficient of expansion of the mandrel should be at least about 10% in excess of the mean coefficient of thermal expansion of the bushing material at the diffusion-bonding temperature employed.

The final assembly of the part, the bushing and the contained mandrel is then subjected to solid state diffusion at an elevated solid state temperature of the metal part corresponding to at least about 50% of the absolute melting point of the metal from which the part is made, the time at temperature being sufficient to make use of the expansion pressure of the mandrel and thus effect diffusion bonding of the bushing and the metal part.

Following the diffusion-bonding cycle, the assembly is cooled to ambient temperature, the mandrel removed, and the hole in the bushing then machined to specified dimensions thereby providing a completely overhauled part. Following removal of the mandrel the part is preferably heat treated prior to machining.

The invention is particularly applicable to the repair of compressor blades used in a fan rotor, such as blades made of a titanium-base alloy containing about 8% Al, 1% Mo, 1% V and the balance essentially titanium. In a preferred embodiment, stock is removed from the damaged working surfaces of mounting holes in the tangs. Thus, the hole is enlarged and provided with a smooth finish. A relatively thin sleeve or bushing of substantially the same alloy as the metal part is inserted into the enlarged hole, the fit being substantially a close fit. A mandrel of a different material, e.g., 347 stainless steel, is used since it has a greater thermal coefficient of expansion than the titanium-base alloy.

The sleeve or bushing is sandwiched between the mandrel and the tang being repaired Once the parts are closely fitted together, they are placed in a furnace and heated under substantially non-oxidizing conditions to an elevated solid state diffusion temperature sufficiently high to effect superplastic forming of the bushing by virtue of the stress arising from the expansion of the mandrel against the bushing. The protective condition in the furnace may be achieved by conducting the bonding operation in a vacuum, or in an inert or reducing atmosphere. Unlike other bonding techniques in which the parts are fusion welded together, the interface between the bonded parts is hardly noticeable and is a thin line at best and does not show a fusion or diffusion zone characteristic of liquid phase welding.

It is important that the mandrel material be compatible with the bushing material and not form a low melting phase at elevated diffusion temperatures. Likewise, if the bushing material is different from the alloy of the metal part being repaired, it also should be compatible therewith and not react at elevated diffusion temperature to form a low melting phase, such as a eutectic phase.

The temperature employed should be sufficient to produce the desired interfacial bonding but not so high as to cause substantial grain growth. As different materials have different absolute melting points, the diffusion-bonding temperature is preferably related to the homologous temperatures of such materials, the selected homologous temperature being at least about 50% of the absolute melting point (solidus) of the material being bonded. In the case of titanium-base alloys, e.g., titanium alloys containing at least about 80% titanium, the homologous temperature may range from about 50% to about 75% of the absolute melting point (solidus) of the titanium alloy.

The materials and techniques employed in carrying out the process provide repaired parts with improved physical and metallurgical characteristics.

Fatigue and wear damage are generally considered to be the most serious causes of failure in machinery components because they occur in normal service without excessive overloads under normal operating conditions. Many minute changes take place in the crystalline structure of metals under the action of repetitive or cyclic load applications. The two most important are the formation of tiny cracks that usually grow to cause fracture, and wear caused by friction between working parts. Such phenomena result in progressive degradation of the working surfaces, including dimensional changes of the parts.

Certain mechanical parts, for example gas turbine engine fan blades, which are attached to a disk by retaining pins, revolve around the engine's center axis several thousand times per minute while the engine is operating. The centrifugal forces developed during rotation place a very large stress on the tangs of the blades, the retaining pins, and the disk. These stresses adversely affect the pin holes of the tang blades and the disk, as well as the retaining pins, causing wear and fretting, leading to the formation of fatigue cracks which render the parts unserviceable.

In accordance with the invention, the damaged parts can be recovered by using the steps of enlarging the pin holes to remove the damaged portion and inserting into the enlarged holes bushings or sleeves of the same material as the blades or disks. The mandrel inserted into the bushing is necessarily of a different material since its coefficient of expansion must be greater than that of the blade or disk material, so long as the mandrel material is compatible with the blade or disk material, that is to say, does not form a low melting phase during the high temperature diffusion-bonding treatment.

After the bushing is diffusion-bonded to the part that was damaged, the bushing is machined to meet the blueprint specification for the pin hole size and its location.

In one embodiment of the invention, the workpiece holes are enlarged without deburring followed by a hard lap to obtain a smooth surface finish on the hole surfaces. These surfaces are then preferably etched in a dilute acid mixture just long enough to remove all surface impurities and surface oxides. Each of the holes is then fitted with a bushing or sleeve of substantially the same material as the workpieces being refurbished. A mandrel made from a material with an appropriate coefficient of thermal expansion is inserted in the bore of each sleeve and held in place, an interference fit being preferred. The parts are then heated under protective conditions, e.g., in vacuum, for a length of time at a selected temperature sufficient to promote a small degree of super plastic deformation caused by the expansion of the mandrels, and thereby promote solid state welding of the sleeves to the workpiece by diffusion bonding. After welding, the mandrels are removed from the workpiece and the workpiece is then heat treated to restore its properties. Once heat treated, the workpiece holes (that is, of the bushings) are machined to appropriate dimensions.

DETAILS OF THE INVENTION

An investigation was conducted on the repair of worn TF-34 fan blades, the wear being at the tang pin holes. A typical blade 10 is shown in FIG. 1 together with a disk 11 and retaining pin 12, the view shown being an exploded view in which the pin and blade are out of scale relative to the disk.

The blade has three tangs 13 with pin-receiving holes 14 therein, the tangs being sized to form a lap joint connection with the disk via pin 12. The holes in the tangs are on the same axis for snugly receiving the pin.

The disk 11 has a pair of peripheral flanges 11A, 11B defining a peripheral annular space 15 into which the middle tang of blade 10 is inserted, the holes in the tangs lining up with corresponding pin-receiving holes 16 spaced around the flanges. The two outside tangs of the blades overlap each side of the flanges when mounted.

A tang 17 is shown in FIG. 2A with fatigue cracks 18 surrounding hole 19. This is the damage which is removed by machining the hole 19 being enlarged and shown as 19A in FIG. 2B. A bushing 20 of preferably the same material is inserted into tang 17 as depicted in FIG. 2C, the fit being a close fit to allow for good welding contact when expanded by pressure.

Following insertion of the bushing, a mandrel 21 of a metal having a higher mean thermal coefficient of expansion than the bushing material is inserted into the bushing opening (FIG. 2C). The assembly is then heated to a selected diffusion-bonding temperature. The expansion of the mandrel results in peripheral pressure against the bushing which bonds to the tang by solid state welding; otherwise referred to as solid state diffusion bonding.

FIG. 3 is an exploded view of the parts prior to assembly showing a single piece mandrel 21, bushing 20 and tang 17 of a turbine blade (not shown).

In one embodiment of the invention, the turbine blade material is a titanium-base alloy. An alloy in particular is one containing about 8% Al, about 1% Mo and about 1% V, this alloy being particularly useful for gas turbine fan blades.

Other titanium base alloys include the following by weight: (1) an alloy containing 6% Al, 4% V, and the balance essentially titanium; (2) an alloy containing 5% Al, about 2.5% Sn, and the balance essentially titanium; (3) an alloy containing 7% Al, 4% Mo, and the balance essentially titanium; (4) an alloy containing 5% Al, 1.5% Fe, 1.4% Cr, 1.2% Mo, and the balance essentially titanium, among others.

Generally speaking, the invention is applicable to titanium-base alloys containing at least about 80% Ti, up to about 8% or 10% Al, up to about 15% Mo, up to about 15% V, up to about 15% Cr, up to about 10% Fe, up to about 15Sn, and up to about 10% Zr.

A preferred mandrel material is austenitic stainless steel. Type 347 stainless steel is particularly useful. This steel contains in the neighborhood of about 0.05 to 0.1% by weight of carbon, up to about 2 or 3% Mo, up to about 1 or 2% Si, about 17 to 19% Cr, about 9 to 13% Ni, 10 times % C minimum of Nb and/or Ta, and incidental amounts of P and S of less than about 0.05%. Examples of other austenitic stainless steel are Type 316, Type 321 and Type 348.

Austenitic stainless steels are advantageous in that their mean coefficients of thermal expansion are substantially higher than those for titanium-base alloys. For example, the mean coefficient of thermal expansion of such stainless steels are generally in the range of about $10 \times 10^{-6}$ in/in/°F.; whereas, titanium-base alloys exhibit mean coefficients of thermal expansion ranging from over 5 to about $6.5 \times 10^{-6}$ in/in/°F.

Type 347 stainless has a mean coefficient of thermal expansion from 30° F. to 1000° F. of about $10.3 \times 10^{-6}$ in/in/°F.; whereas, the Ti-8-1-1 alloy exhibits a mean coefficient of thermal expansion from room temperature to 1200° F. of about $6.5 \times 10^{-6}$ in/in/°F. Thus, Type 347 stainless steel has a mean coefficient of thermal expansion about 58% greater than that of the aforementioned titanium-base alloy. In selecting the mandrel material, the mean coefficient of thermal expansion should be at least about 10% greater than that of the workpiece, and preferably, at least about 20% over comparable temperature ranges.

Results obtained from a preliminary investigation concerning the repair of worn TF-34 fan blade tang pin holes by the solid state diffusion welding of new material to the blade tangs revealed that there are 3 important conditions to be considered in order to obtain good quality bonding. These conditions are as follows:

(a) Bonding at a minimum temperature of about 1750° F. in order to produce a small degree of superplastic forming and to overcome the activation energy required for diffusion to take place.

(b) Overcoming a 100% stress relaxation observed in titanium alloys after 2.0 hrs. at temperatures above 1350° F.

(c) Designing mandrel configurations and machining of mating parts in such a way as to eliminate gaps caused by misalignment and pressure hill effect during the diffusion welding process.

Previous work has revealed that microstructural changes take place when Ti-8-1-1 alloy is heated to temperatures above 1350° F. This makes the heat treating of diffusion welded parts necessary in order to restore the original microstructure.

In carrying out the invention, it is important that the mechanical properties of the TF-34 fan blades meet or exceed all applicable customer and O.E.M. specifications. Various experiments were conducted to determine the optimum conditions required for diffusion welding to take place, and to attempt to restore the microstructure of the fan blade tangs to its original configuration. These experiments were carried out and their results are described as follows:

EXAMPLE 1

Figure 4:
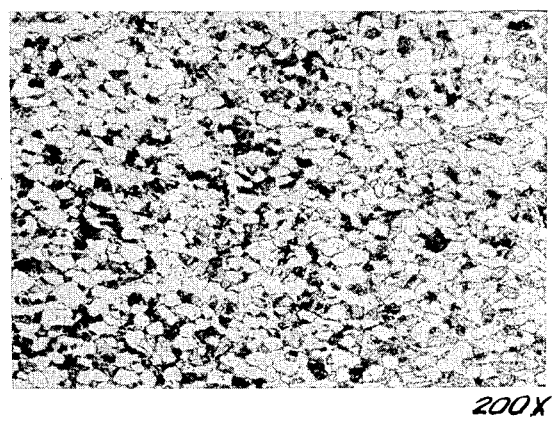
FIGS. 4 to 10 are photomicrographs of titanium alloy parts before assembly and also of assembled parts after solid state diffusion welding with some taken at 100 times magnification and some at 200 times magnification.
Figure 5:
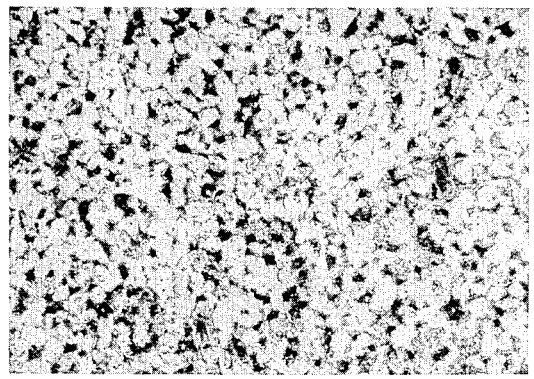

This test consisted of cutting a piece of Ti-8-1-1 alloy from a scrap fan blade and examining its microstructure, shown in FIG. 4. This sample was then heated at 1750° F. for 6 hours in vacuum and allowed to cool to room temperature. Its microstructure was examined and it was found that the beta (dark) phase had coarsened, while the amount of alpha (light) phase had decreased by a small amount, as shown in FIG. 5.

Figure 6:
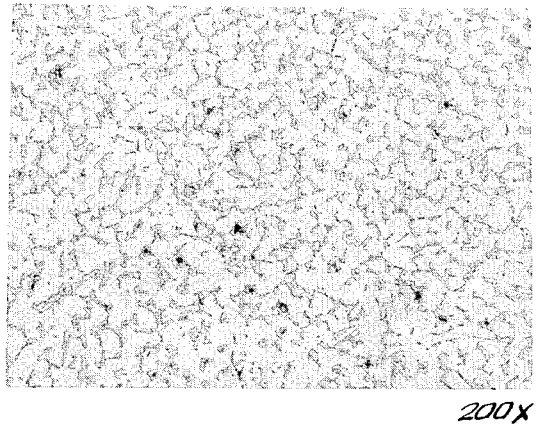

To restore the microstructure to original form, a solution anneal was carried out by heating the parts to 1825° F. for 1 hour in vacuum, followed by rapid cooling in a protective atmosphere, such as argon. This was followed by a stabilizing anneal, which consisted of heating the sample to 1350° F. for 2 hours, followed by rapid cooling in a protective atmosphere. The sample's microstructure was examined and it was noted that he alpha/beta ratio had been restored, but grain size had grown by 15 to 20%, as shown in FIG. 6.

EXAMPLE 2

To determine whether diffusion welding could be achieved at 1750° F., a scrap TF-34 fan blade was obtained, and the holes in the fore and aft tangs were bored out to a diameter of 0.820 inch and the I.D. surfaces honed to a smooth finish, e.g., RMS 16 or better. Two sleeves were machined from Ti-8-1-1 bar stock to an O.D. of 0.820 inch and a 0.680 inch I.D.; the O.D. surface was also smoothly honed, for example, to 16 RMS or better in both sleeves. The sleeves and tangs were then etched with a dilute acid mixture to remove surface contamination. The sleeves were then fitted into the tang holes, with a specially designed mandrel made from 347 stainless steel fitted inside each sleeve and held in place by shoulder pins. The assembled part is not shown in the drawing.

The assembled part was placed in a vacuum furnace and heated to 1750° F. for 6 hours. The mandrels were then removed and the part was solution annealed at 1825° F. for 1 hour, followed by a stabilizing anneal at 1350° F. for 2 hours. The experiment yielded the following results:

(a) Bonding took place thoughout a great part of the mating surfaces, except for some voids found in random areas (not shown).

Figure 7:
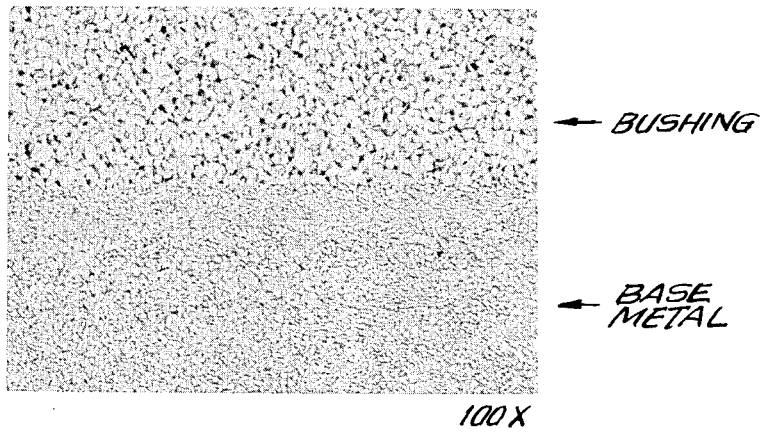

(b) However, the proper alpha/beta ratio required of the material's microstructure was achieved, as shown in FIG. 7.

(c) Grain growth was still evident in the microstructure.

(d) It was noted that subjecting the fan blade to the temperature used in this example caused it to distort by curling.

After evaluating the results obtained from Example 2, an additional test was conducted in the same fashion, with three major changes, which are as follows:

EXAMPLE 3

1. The blade tang holes were machined to 0.800 inch I.D. while the sleeves were also machined to 0.800 O.D., in order to provide a thinner wall and achieve super plastic forming.

2. The tang holes were machined without deburring to obtain the desired smooth surface finish.

3. To minimize distortion, the fan blade was insulated with refractory fiber, leaving only the tang area exposed.

Figure 8:
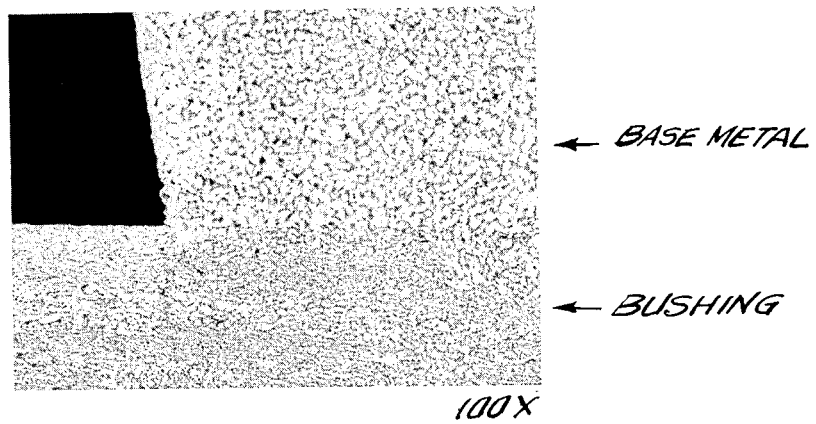

The results obtained from this test showed that bonding took place throughout the mating surfaces, except for a few randomly located gaps. The results also showed a marked improvement in the bonding quality around the edge regions, as shown in FIG. 8. Visual examination of the part showed that much less distortion took place during the bonding and heat treatment processes.

EXAMPLE 4

This test was carried out to find out if increasing the diffusion welding temperature while decreasing the time at temperature would produce a better, more uniform bond and keep grain growth to a minimum.

Figure 9:
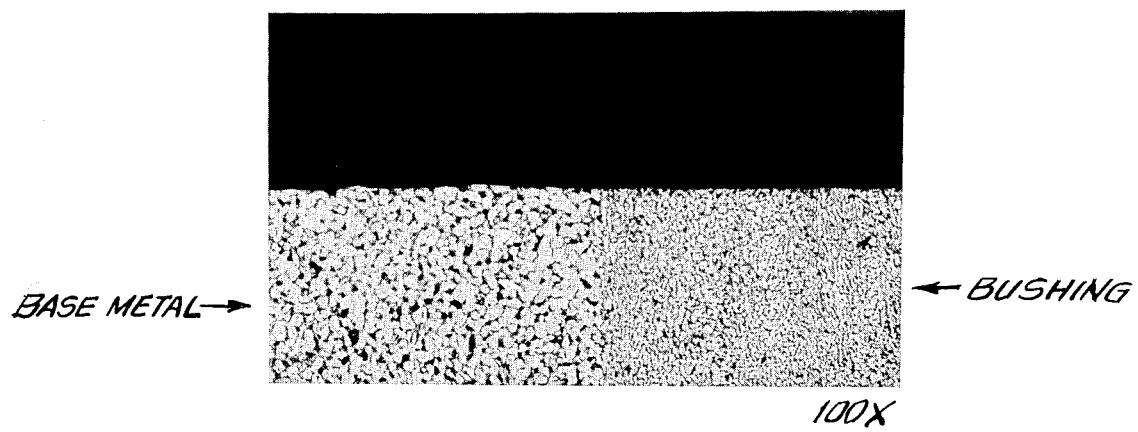
Figure 10:
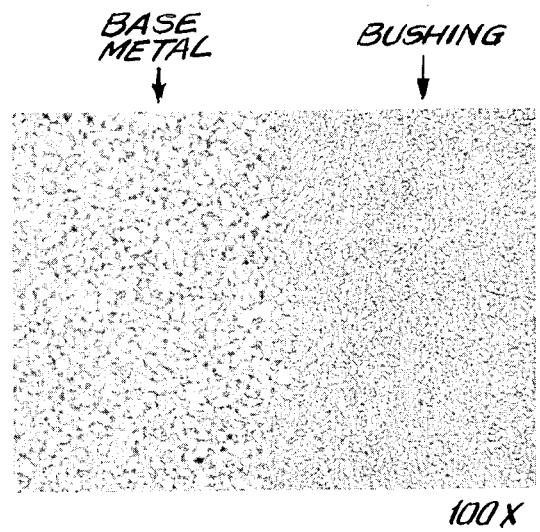

A Ti-8-1-1 sleeve was fitted to a fan blade tang in he same fashion as the previous experiments. The assembled parts were then heated to 1825° F. for about one-half hour under non-oxidizing conditions, for example, in a vacuum furnace, to promote bonding. After completing this process, the mandrel was removed from the tang which was given a stabilizing anneal at 1350° F. for one hour. The experiment produced the following results:

(a) Complete bonding took place between the mating surfaces and around the edges, as shown in FIGS. 9 and 10.

(b) Grain growth was kept to a minimum.

(c) Good superplastic forming was achieved, as shown in FIG. 9.

(d) The alpha to beta ratio was not properly restored because cooling of the welded tang from 1825° F. could not be achieved fast enough due to the mass of the mandrel, and because a temperature higher than 1825° F. would have to be used during solution annealing. This condition is correctable by bonding at 1800–1815° F. for a shorter period of time, followed by the usual annealing treatments.

The test program yielded a considerable amount of information concerning the diffusion welding behavior of Ti-8-Al- 1 MO - 1 V alloy; the most important information obtained is listed as follows:

(a) Diffusion welding will always take place at 1750° F., but bond quality is not always satisfactory.

(b) Diffusion welding at temperatures above 1800° F. produces good quality bonding, requiring only about 15 to 30 minutes soak time. This produces negligible grain growth and just enough super plastic deformation to bring the mating surfaces into intimate contact.

(c) Contaminants in the mating surfaces should be avoided, otherwise a loose fit will result in poor bonding quality due to the formation of gaps.

(d) Heat treatment after welding for titanium-base alloys is necessary in order to restore the microstructure of the blades to its original configuration.

(e) Care must be exercised in carrying out the invention as diffusion welding and subsequent heat treatment can result in distortion of the blades (note results of Example 3).

As stated above, following completion of the diffusion-bonding process, the mandrel is removed. In instances where the mandrel sticks to the bushing, the mandrel is removed mechanically by machining and the diffusion-bonded bushing remaining is then machined to the required internal dimensions.

Preferably, the mandrel is provided with a barrier coating so that the mandrel can be simply mechanically removed without machining. A preferred barrier coating is gold where the assembly constitutes a stainless steel mandrel and the bushing is a titanium-base alloy, e.g., such as Ti-8Al-1Mo-1V.

The gold coating on the stainless steel mandrel, e.g., Type 347 stainless, is electro-deposited as a flash coating. The thickness may range from about 0.00005 to about 0.0015 inch. Gold does not diffusion-bond to any extent to titanium-base alloys and, as a result, the gold plated mandrel can be easily mechanically removed from the internal opening of the bushing.

Other flash coatings that can be used on the mandrel to inhibit diffusion into the titanium-base alloy bushing during diffusion bonding include chromium, platinum, palladium, iridium, etc. The term "barrier coating" used in the claims is meant to cover such coatings which will allow easy removal of the mandrel.

The invention is also applicable to parts having threaded holes in which the threads have been damaged. In this case, the damaged threads would be machined out, the damaged hole repaired as described hereinabove, the mandrel removed and the bushing cleanly machined preparatory to cutting threads therein.

While the invention has been described relative to the repair of titanium-base alloy parts, the invention is also applicable to other metals, such as molybdenum-base alloys, tungsten-base alloys, nickel-base alloys, iron-base alloys, and the like. The diffusion-bonding temperatures employed for such alloys would be at least 50% of the absolute melting point (solidus) of the materials being bonded. In the case of the nickel-base alloy known by the trademark Inconel 600 containing about 76% Ni, 16% Cr and 8% Fe, the complete melting temperature is about 1425° C., the solidus temperature being about 1395° C. The coefficient of expansion from 68° F. to 1400° F. is about $8.7 \times 10^{-6}$ in/in/° F. Type 347 stainless could be used as a mandrel material.

A molybdenum-base alloy containing 0.5% Ti by weight has a coefficient of expansion from 68° F. to 1830° F. of about $3.4 \times 10^{-6}$ in/in/°F. In this case, Inconel 600 could be us mandrel material, the barrier material, if preferred, being a flash coating of gold.

An iron-base alloy designated as 17-7 PH (a precipitation hardening alloy containing 17% Cr and 7% of Ni) can be treated according to the invention. This alloy has a coefficient of expansion from 70° F. to 800° F. of about $6.6 \times 10^{-6}$ in/in/°F.

The mandrel material used for such alloys should have a coefficient of expansion at the diffusion-bonding temperature of at least about 10% greater than the material being treated, and preferably, at least about 20% greater. The preferred metals to be treated are those having a melting point in excess of about 1000° C., although alloys of lower melting points can be similarly treated.

The invention is particularly applicable to the repair of turbine blades, such as fan blades, compressor blades, and the like. The term "turbine blade" is used in a broad sense to cover blades secured to the periphery of a rotary member.

In addition to providing a method for repairing damaged holes, the invention also provides a repaired metal part comprising a main body portion having a through cylindrical opening therein defined by a solid state diffusion-bonded metal bushing, the solid state bond between the periphery of the bushing and the main body portion being characterized metallographically by a sharp line of demarcation at the bonding interface between the bushing and the main body portion. In one embodiment, the repaired metal part of the main body portion of the metal part is a titanium-base alloy, and the diffusion-bonded bushing therein is substantially the same alloy as the main body portion.

The invention is also directed to a repaired metal turbine blade characterized by a main foil portion and at least one tang extending from a bottom portion thereof, said tang having a through cylindrical opening defined by a solid state diffusion-bonded metal bushing therein, the solid state bond between the periphery of the bushing and the tang being characterized metallographically by a sharp line of demarcation at the bonding interface between the bushing and the tang. In one embodiment, the repaired turbine blade and the tang extending therefrom are made of a titanium-base alloy, with the diffusion-bonded bushing therein made of substantially the same alloy.

As stated hereinbefore, the interface between the welded parts is characterized by a sharp weld line of demarcation and does not show a fusion or diffusion zone characteristic of liquid phase welding. The sharp line of demarcation abruptly separates the zone containing the grains of the metal substrate on one side of the weld line from the zone containing the grains of the bonded bushing on the other side of the line (Note FIGS. 7 to 10).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for repairing by solid state diffusion a damaged portion of an inner surface of a pin-mounting hole of a used turbine engine metal part, wherein said hole has been stress damaged during service while mounted to another part via a pin passing through said hole, which comprises, machining said stress damaged hole to provide a cylindrical diameter sufficient to remove the damaged portion therefrom and provide said used component with a new hole with a smooth finish, providing a metal bushing having inner and outer diameters, said outer diameter being of size and finish relative to the machined diameter of the said hole to provide a close fit therewith, the composition of said metal bushing being compatible with that of the metal part, inserting said bushing into the machined hole of the metal part, providing a cylindrical metal single piece mandrel of diameter corresponding to the inner diameter of the bushing, the diameter of said mandrel being sufficient to provide a close fit with said bushing, inserting said single piece mandrel into the bushing to provide an assembly thereof with said metal part, said metal single piece mandrel having a mean coefficient of thermal expansion of at least about 10% greater than that of the metal bushing for a selected solid state diffusion temperature sufficient to provide pressure to said bushing, and then subjecting said assembly under substantially non-oxidizing conditions to solid state diffusion at an elevated solid state temperature corresponding to at least about 50% of the absolute melting point (solidus) of the metal part for a time at least sufficient to diffusion bond the bushing under pressure to said metal part by virtue of the expansion of said mandrel in said bushing at said diffusion temperature, but not exceeding that temperature and time at which substantial grain growth occurs, cooling said assembly to ambient, removing said mandrel, and then machining the inner diameter of said diffusion-bonded bushing to the specified diameter of said metal part.

2. THe method of claim 1, wherein following removal of the mandrel, the part is heat treated prior to the machining of said bushing.

3. The method of claim 1, wherein the mandrel is removed following diffusion bonding by machining.

4. The method of claim 1, wherein the mandrel has a carrier coating, whereby the mandrel is capable of being mechanically removed from the assembly following diffusion bonding.

5. The method of claim 4, wherein the barrier coating is gold.

6. A method for repairing by solid state diffusion a damaged portion of an inner surface of a pin-mounting hole of a used turbine engine metal part made of titanium-base alloy composition, wherein said hole has been stress damaged during service while mounted to another part via a pin passing through said hole, which comprises,
- machining said stress damaged hole of said titanium-base alloy part to provide cylindrical diameter sufficient to remove the damaged portion therefrom and provide said used part with a new hole with a smooth finish,
- providing a metal bushing of said substantially said titanium-base alloy composition having inner and outer diameters,
  - said outer diameter being of size and finish relative to the machined diameter of the said hole to provide a close fit therewith,
- inserting said bushing into the machined hole of the metal part,
- providing a cylindrical metal single piece mandrel of diameter corresponding to the inner diameter of the bushing,
  - the diameter of said mandrel being sufficient to provide a close fit with said bushing,
- inserting said single piece mandrel into the bushing to provide an assembly thereof with said metal part,
- said metal single piece mandrel having a coefficient of expansion of at least about 10% greater than that of the metal bushing for a selected solid state diffusion temperature sufficient to provide pressure to said bushing,
- and then subjecting said assembly under substantially non-oxidizing conditions to solid state diffusion at an elevated solid state temperature corresponding to at least about 50% of the absolute melting point of the titanium-base alloy for a time at least sufficient to diffusion bond the bushing under pressure to said metal part by virtue of the expansion of said mandrel in said bushing at said diffusion temperature, but not exceeding that temperature and time at which substantial grain growth occurs,
- cooling said assembly to ambient,
- removing said mandrel,
- and then machining the inner diameter of said diffusion-bonded bushing to the specified diameter of said metal part.

7. The method of claim 6, wherein following removal of said mandrel, the part is heat treated prior to the machining of said bushing.

8. The method of claim 6, wherein the mandrel is removed following diffusion bonding by machining.

9. The method of claim 8, wherein the mandrel is comprised of austenitic stainless steel.

10. The method of claim 6, wherein the mandrel has a barrier coating, whereby the mandrel is capable of being mechanically removed from the assembly after diffusion bonding.

11. The method of claim 10, wherein the barrier coating is gold.

12. The method of claim 6, wherein the diffusion bonding temperature ranges from about 1750° F. to 1900° F.

13. The method of claim 6, wherein the titanium-base alloy contains by weight at least about 80% Ti and the balance essentially up to about 8 or 10% Al, up to about 15% Mo, up to about 15% V, up to about 15% Cr, up to about 10% Fe, up to about 15% Sn, and up to about 10% Zr.

14. The method of claim 13, wherein the titanium-base alloy contains about 8% Al, about 1% Mo, about 1% V, and the balance essentially titanium.

15. The method for repairing a used turbine blade by solid state diffusion in which the inner surface of at least one pin-mounting hole of a specified diameter in said blade has been stress damaged during service while pin-mounted to a rotary disk, which comprises,
- machining said stress damaged hole to a new cylindrical diameter sufficient to remove the damaged portion therefrom and provide a new mounting hole in said blade with a smooth finish,
- providing a metal bushing having inner and outer diameters,
  - said outer diameter being of size and finish relative to the machined diameter of the said hole to provide a close fit therewith,
- inserting said bushing into the machined hole of said blade,
- providing a cylindrical metal single piece mandrel of diameter corresponding to the inner diameter of the bushing,
  - the diameter of said mandrel being sufficient to provide a close fit with said bushing,
- inserting said single piece mandrel into the bushing to provide an assembly thereof with said turbine blades,
- said metal single piece mandrel having a mean coefficient of thermal expansion of at least about 10% greater than that of the metal bushing for a selected solid state diffusion temperature sufficient to provide pressure to said bushing,
- and then subjecting said blade under substantially non-oxidizing conditions to solid state diffusion at an elevated solid state temperature corresponding to at least about 50% of the absolute melting point (solidus) of the metal part for a time at least sufficient to diffusion bond the bushing under pressure to the mounting hole of said blade by virtue of the expansion of said mandrel in said bushing at said diffusion temperature, but not exceeding that temperature and time at which substantial grain growth occurs,
- cooling said assembly to ambient,
- removing said mandrel,
- and then machining the inner diameter of said diffusion-bonded bushing to the specified diameter of said metal part.

16. The method of claim 15, wherein following removal of said mandrel, the part is heated treated prior to the machining of said bushing.

17. The method of claim 15, wherein the mandrel is removed following diffusion bonding by machining.

18. The method of claim 15, wherein the mandrel has a barrier coating, whereby the mandrel is capable of being mechanically removed from the assembly following diffusion bonding.

19. The method of claim 18, wherein the barrier coating is gold.

20. The method of claim 16, wherein the mandrel is austenitic stainless steel.

21. A method for repairing a used turbine blade of a titanium-base alloy by solid state diffusion in which the inner surface of at least one pin-mounting hole of a specified diameter in said blade has been stress damaged during service while pin-mounted to a rotary disk, which comprises, machining said at least one stress damaged hole of said titanium-base alloy blade to a new cylindrical diameter sufficient to remove the damaged portion therefrom and provide a new mounting hole in said blade with a smooth finish, providing a metal bushing of substantially said titanium-base alloy having inner and outer diameters, said outer diameter being of size and finish relative to the machined diameter of the said hole to provide a close fit therewith, inserting said bushing into the machined hole of said blade, providing a cylindrical metal single piece mandrel of diameter corresponding to the inner diameter of the bushing, the diameter of said mandrel being sufficient to provide a close fit with said bushing, inserting said single piece mandrel into the bushing to provide an assembly thereof with said turbine blade, said metal single piece mandrel having a means coefficient of thermal expansion of at least about 10% greater than that of the metal bushing for a selected solid state diffusion temperature sufficient to provide pressure to said bushing, and then subjecting said blade under substantially non-oxidizing conditions to solid state diffusion at an elevated solid state temperature corresponding to at least about 50% of the absolute melting point of the metal part for a time at least sufficient to diffusion bond the bushing under pressure to the mounting hole of said blade by virtue of the expansion of said mandrel in said bushing at said diffusion temperature, but not exceeding that temperature and time at which substantial grain growth occurs.

22. The method of claim 21, wherein following removal of said mandrel, the part is heat treated prior to the machining of said bushing.

23. The method of claim 21, wherein the mandrel is made of austenitic stainless steel.

24. The method of claim 21, wherein the mandrel is removed following diffusion bonding by machining.

25. The method of claim 23, wherein the mandrel has a barrier coating, whereby the mandrel is capable of being mechanically removed from the blade assembly following diffusion bonding.

26. The method of claim 23, wherein the diffusion-bonding temperatures ranges from about 1750° F. to 1900° F.

27. The method of claim 23, wherein the titanium-base alloy contains by weight at least about 80% Ti and the balance essentially up to about 8 or 10% Al, up to about 15% Mo, up to about 15% V, up to about 15% Cr, up to about 10% Fe, up to about 15% Sn, and up to about 10% Zr.

28. The method of claim 27, wherein the titanium-base alloy contains about 8% Al, about 1% Mo, about 1% V and the balance essentially titanium.

* * * * *